(12) United States Patent
Park

(10) Patent No.: US 9,749,611 B2
(45) Date of Patent: Aug. 29, 2017

(54) STEREOSCOPIC IMAGE DEVICE

(71) Applicant: TOVIS CO., Ltd., Incheon (KR)

(72) Inventor: Jeong Kyu Park, Gyeonggi-do (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 14/779,960

(22) PCT Filed: Apr. 18, 2014

(86) PCT No.: PCT/KR2014/003432
§ 371 (c)(1),
(2) Date: Sep. 24, 2015

(87) PCT Pub. No.: WO2014/175609
PCT Pub. Date: Oct. 30, 2014

(65) Prior Publication Data
US 2016/0050406 A1   Feb. 18, 2016

(30) Foreign Application Priority Data

Apr. 25, 2013  (KR) .................. 10-2013-0045930

(51) Int. Cl.
*G07F 17/32* (2006.01)
*H04N 13/02* (2006.01)
(Continued)

(52) U.S. Cl.
CPC ......... *H04N 13/0207* (2013.01); *G02B 27/22* (2013.01); *G02B 27/2221* (2013.01);
(Continued)

(58) Field of Classification Search
CPC ... G02B 27/2228; G02B 7/22; G02B 27/2235
See application file for complete search history.

(56) References Cited

U.S. PATENT DOCUMENTS 5,886,818 A * 3/1999 Summer ................ G02B 27/22
                                                              348/E13.022
6,542,297 B1 * 4/2003 Lee ....................... G02B 7/1824
                                                              345/9
(Continued)

FOREIGN PATENT DOCUMENTS

JP      06-18812 A      1/1994
JP   2006-317708 A    11/2006
(Continued)

OTHER PUBLICATIONS

International Search Report for PCT/KR2014/003432 mailed Aug. 5, 2014 from Korean Intellectual Property Office.

*Primary Examiner* — Michael Caley
*Assistant Examiner* — Jonathan Y Jung
(74) *Attorney, Agent, or Firm* — Revolution IP, PLLC

(57) ABSTRACT

A stereoscopic imaging device including: a body having a stereoscopic image display window for providing a stereoscopic image; an image combining panel which divides an inner space of the body into a first space for providing a virtual image, and a second space for providing a real image, on the stereoscopic image display window, transparency of the image combining panel being changed by input of a power; a first display which is positioned in the first space to provide the virtual image on the stereoscopic image display window through the image combining panel; a target mechanism which is positioned in the second space to provide the real image on the stereoscopic image display window through the image combining panel; an illumination mechanism which is positioned in the second space to illuminate a beam of light onto the target mechanism; and a control unit for controlling the respective units.

8 Claims, 7 Drawing Sheets

(51) Int. Cl.
*G02B 27/22* (2006.01)
*G02F 1/1333* (2006.01)
*G02F 1/1343* (2006.01)
*H04N 13/04* (2006.01)

(52) U.S. Cl.
CPC .... *G02F 1/13439* (2013.01); *G02F 1/133365* (2013.01); *H04N 13/0296* (2013.01); *H04N 13/042* (2013.01); *H04N 13/0438* (2013.01); *G02B 27/2235* (2013.01)

(56) References Cited

U.S. PATENT DOCUMENTS

| | | |
|---|---|---|
| 2002/0077172 A1 | 6/2002 | Uchiyama et al. |
| 2005/0145806 A1* | 7/2005 | Marshall ............ G02B 7/1821 250/559.12 |
| 2005/0243078 A1* | 11/2005 | Ozeki ................ G02F 1/1334 345/204 |
| 2006/0291051 A1* | 12/2006 | Kim ................ H04N 13/0402 359/462 |
| 2011/0149249 A1* | 6/2011 | O'Connell ............ A63J 25/00 353/10 |
| 2012/0057006 A1* | 3/2012 | Joseph ............ H04N 13/0495 348/59 |

FOREIGN PATENT DOCUMENTS

| | | | |
|---|---|---|---|
| JP | 2006317708 A | * | 11/2006 |
| KR | 10-2002-0047013 A | | 6/2002 |
| KR | 10-2005-0057161 A | | 6/2005 |
| KR | 10-0926692 B1 | | 11/2009 |

* cited by examiner

[Fig. 1]
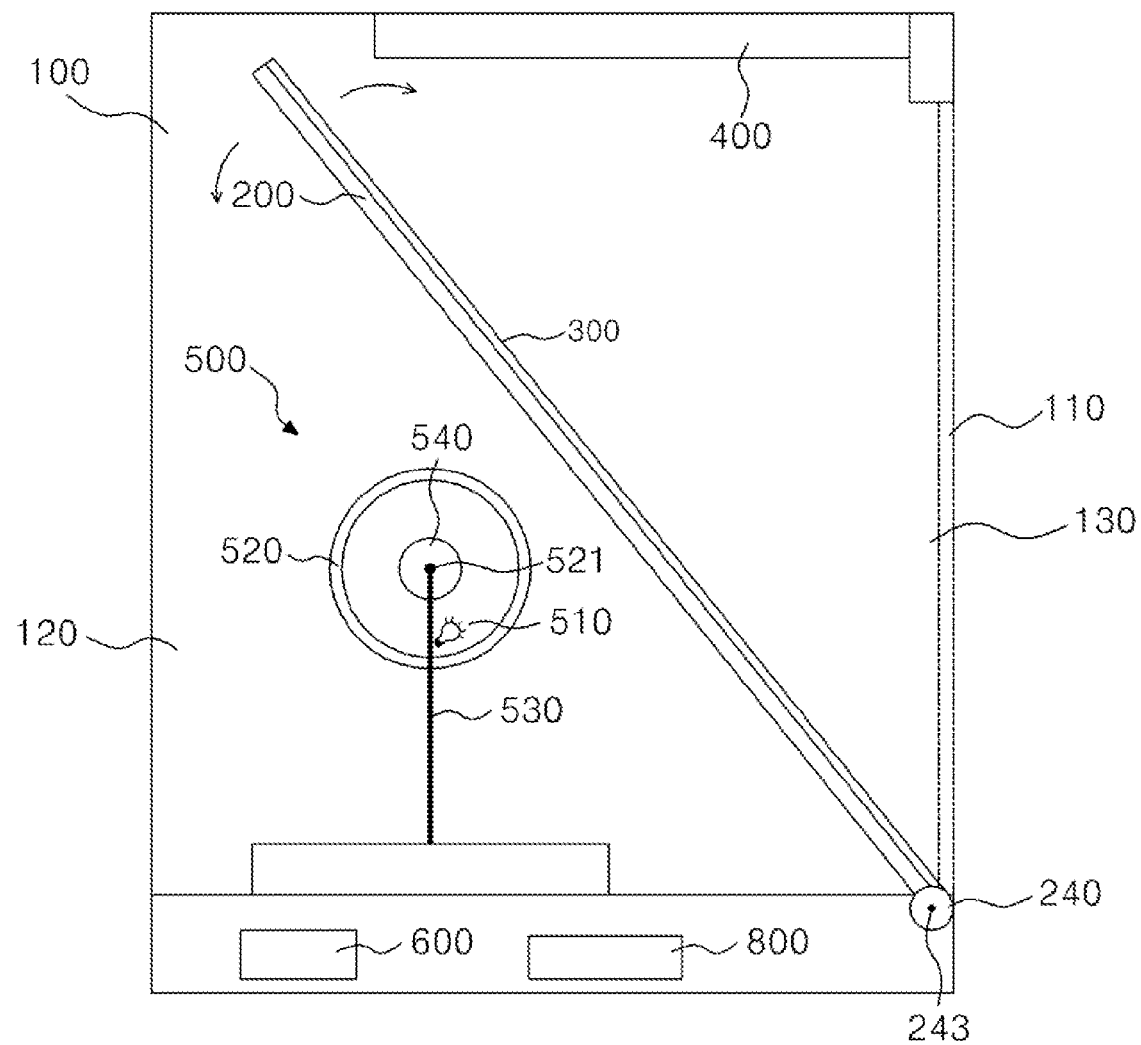

[Fig. 2]
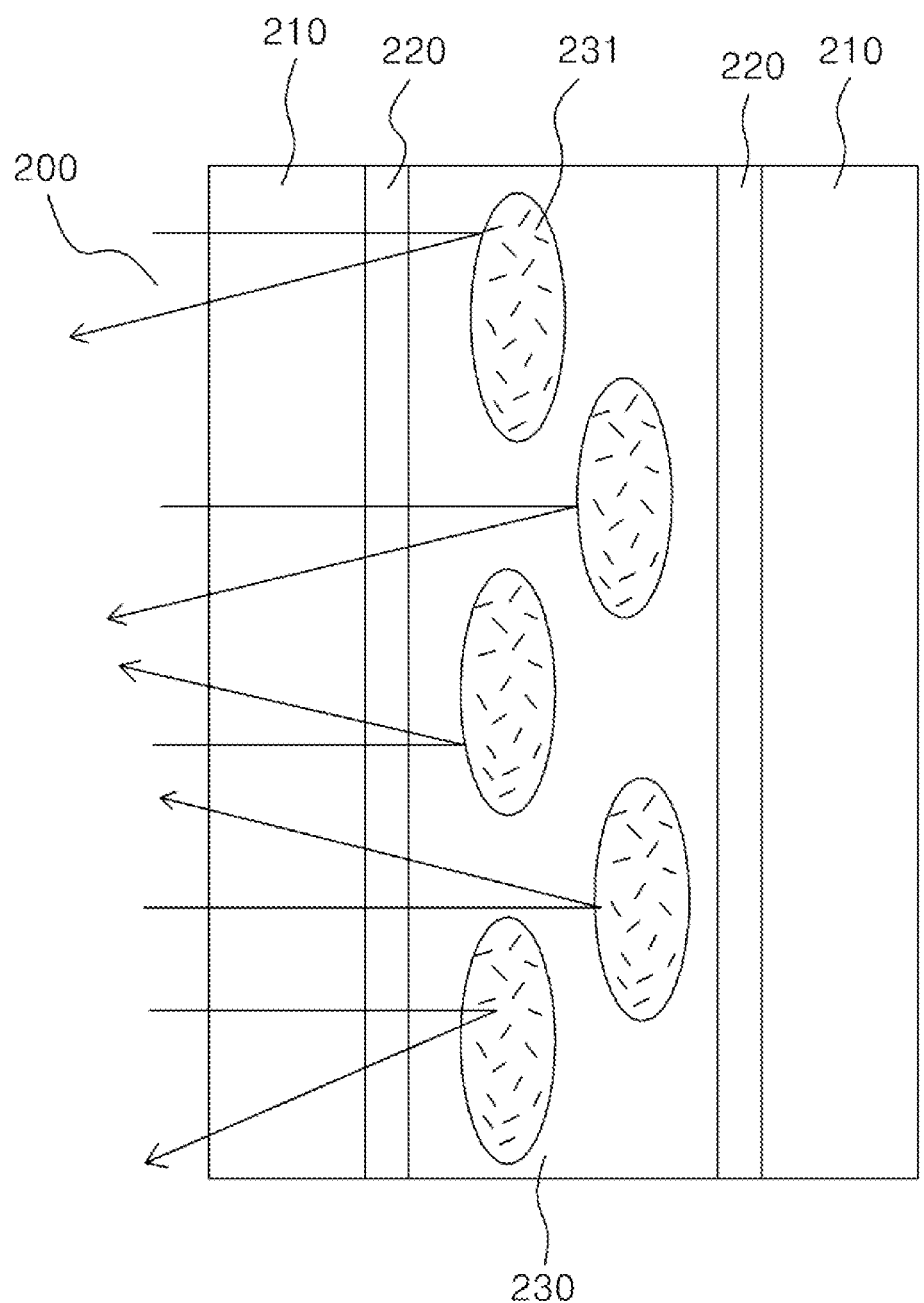

[Fig. 3]
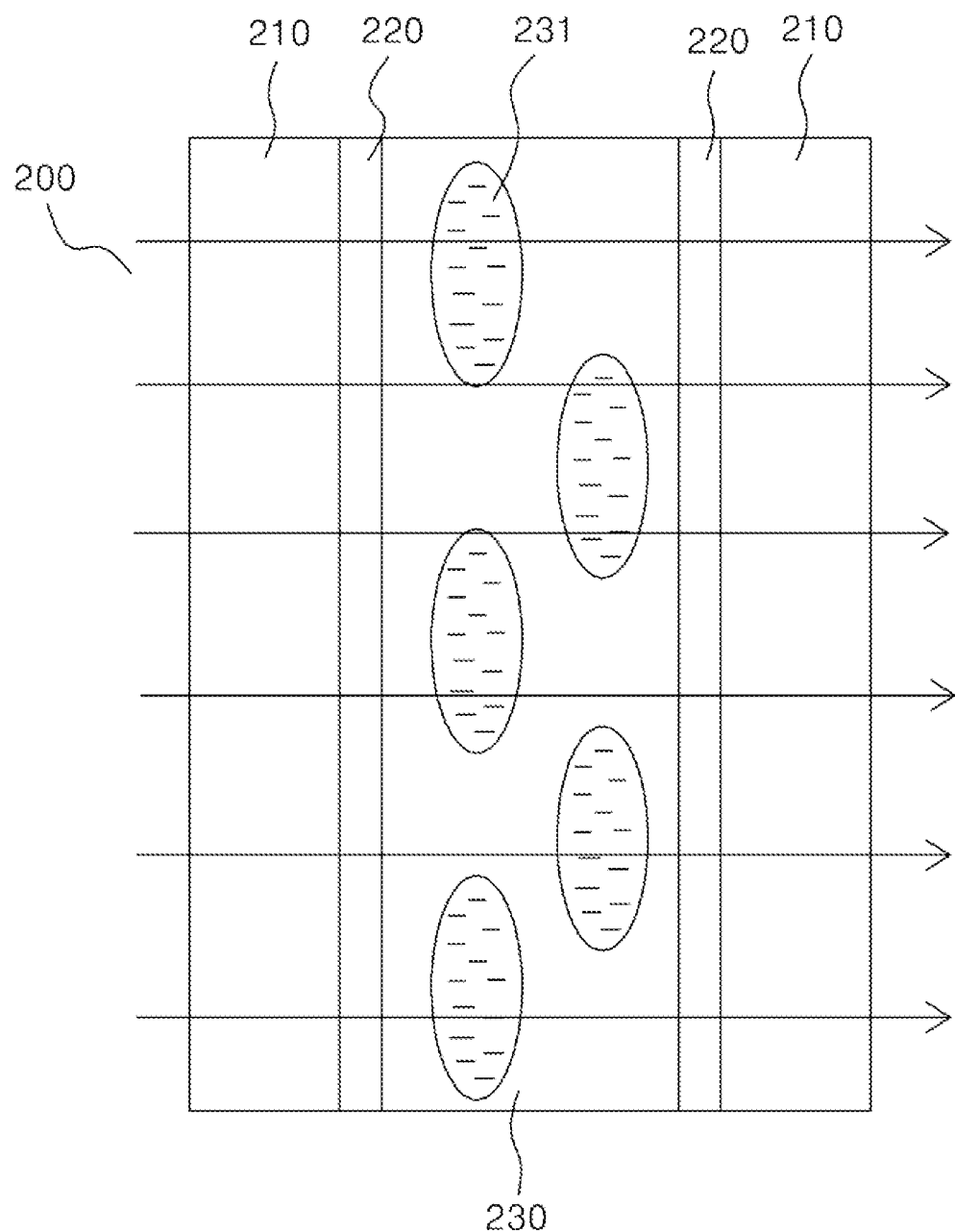

[Fig. 4]
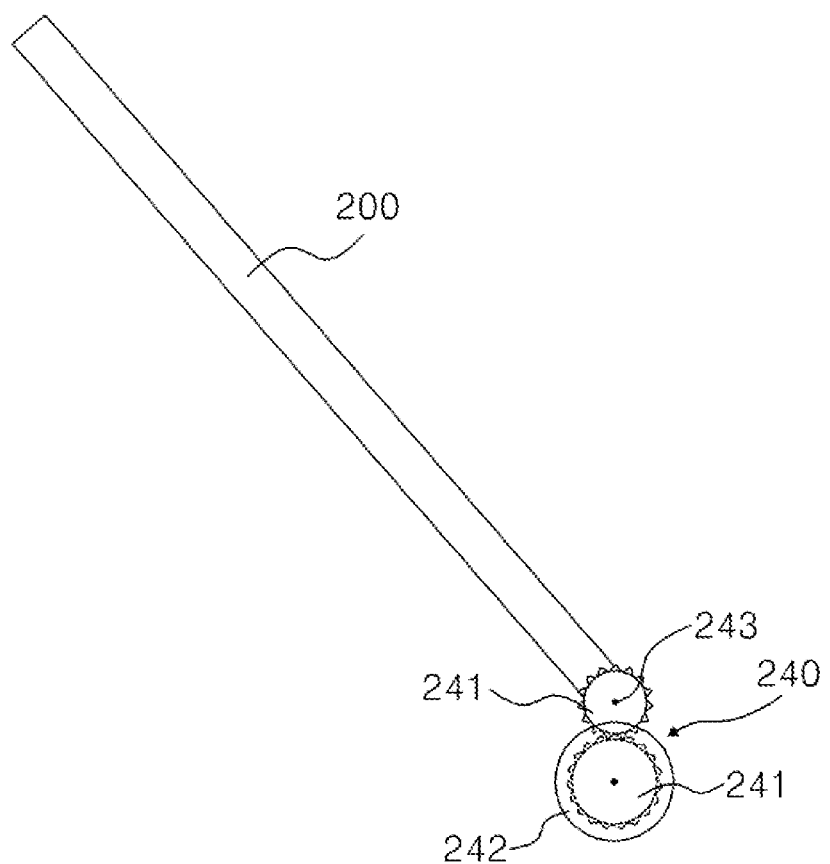

[Fig. 5]
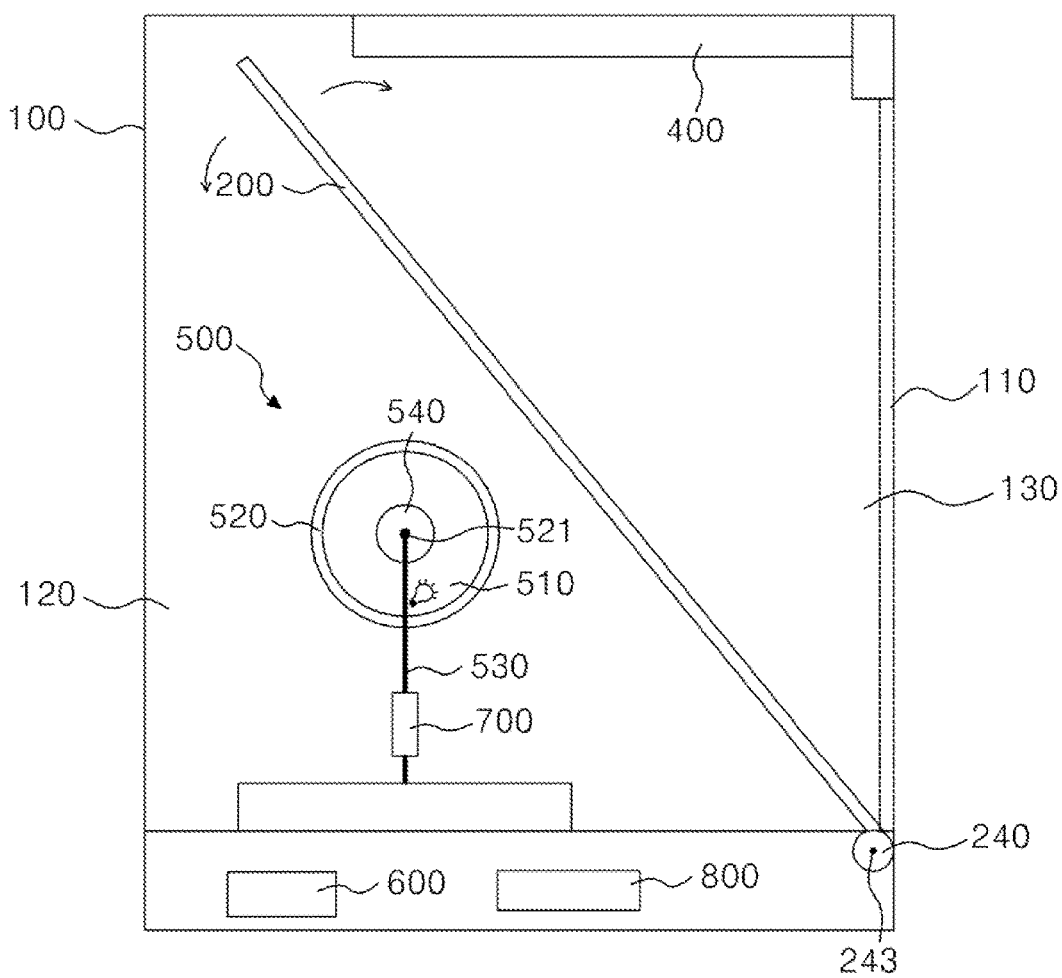

[Fig. 6]
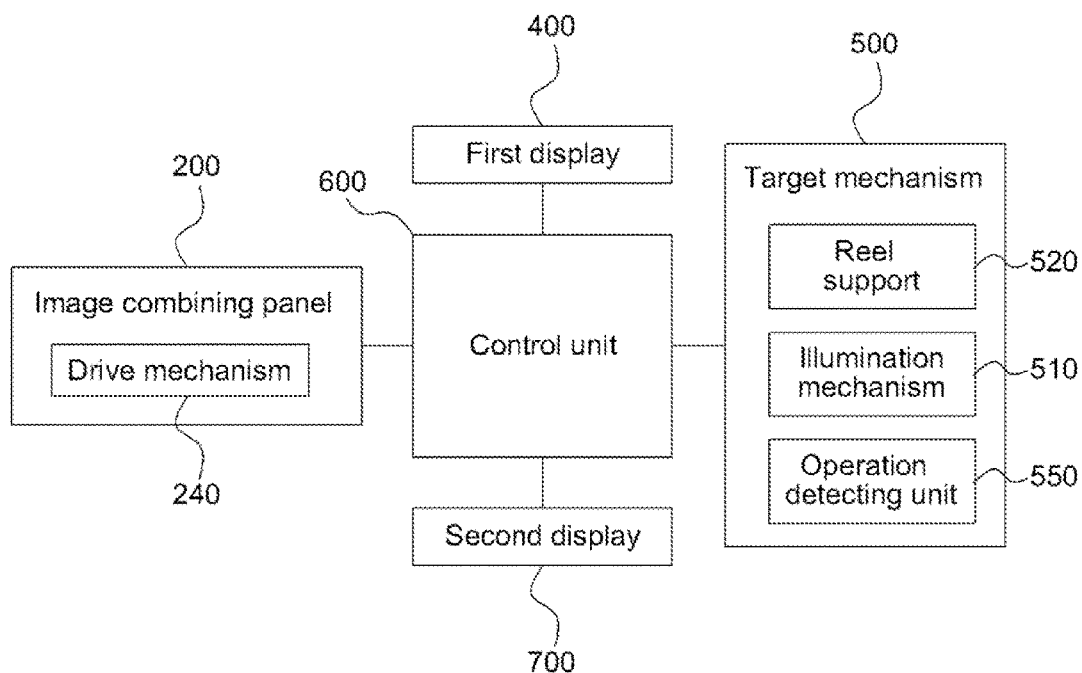

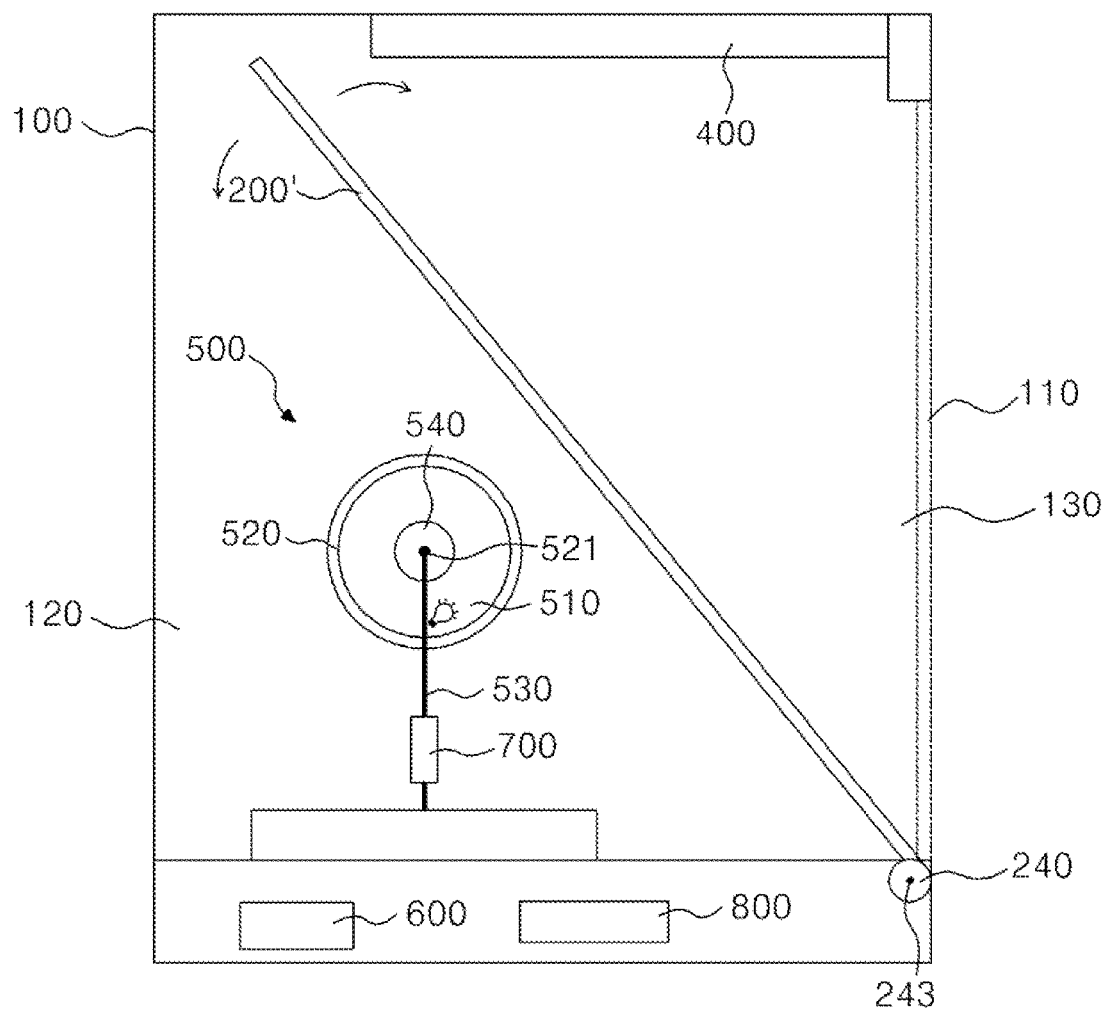
[Fig. 7]

STEREOSCOPIC IMAGE DEVICE

CROSS REFERENCE TO PRIOR APPLICATIONS

This application is a National Stage Application of PCT International Patent Application No. PCT/KR2014/003432 filed on Apr. 18, 2014, under 35 U.S.C. §371, which claims priority to Korean Patent Application No. 10-2013-0045930 filed on Apr. 25, 2013, which are all hereby incorporated by reference in their entirety.

TECHNICAL FIELD

The present invention relates to a stereoscopic imaging device capable of providing a three-dimensional image.

BACKGROUND ART

In general, a stereoscopic imaging device is a device capable of creating or enhancing the illusion of depth in an image. That is, stereoscopy is a technique for creating the illusion of depth in a two-dimensional image, thereby allowing a viewer to perceive the three-dimensional vividness and reality by use of the illusion of depth in the image. According to general stereoscopic imaging devices using the above technique, the same images when respectively seen from left and right eyes of a viewer are combined with each other with a time difference to give one stereoscopic image to the viewer.

One example of the stereoscopic imaging device is disclosed in Korean Patent Registration No. 10-0926693 (Publication Date: Nov. 17, 2009) entitled "Apparatus for Watching Stereoscopic Image."

The Apparatus for watching the stereoscopic image according to the related art includes a first display module which displays a left image, a second display module which displays a right image, a half mirror which allows any one of the left image displayed from the first display module and the right image displayed from the second display module to penetrate, and reflects the other one of the left image and the right image, and an ocular part which selectively provides the left image penetrated or reflected from the half mirror to a left eye of a user, and selectively provides the right image penetrated or reflected from the half mirror to a right eye of the user.

With the above configuration, the apparatus for watching the stereoscopic image according to the related art can create the stereoscopic image by separately displaying the left image and the right image by use of the half mirror.

The apparatus for watching the stereoscopic image according to the related art combines an opaque real image which penetrates the half mirror having low transmissivity and then is provided by the second display module, and a virtual image which is reflected by the half mirror and then is provided by the first display module, to give perception of 3D depth to a viewer. Therefore, there is a problem in that since the stereoscopic image is not sharp, vividness and sense of reality are lowered.

Also, the apparatus for watching the stereoscopic image according to the related art has another problem in that, even though only the image of the first display module is provided so as to give the viewer the two-dimensional image, the second display module which does not provide the image penetrates the half mirror, and thus the viewer who watches the image can perceive the second unnecessary display, thereby lowering the quality of the two-dimensional image.

In addition, the apparatus for watching the stereoscopic image according to the related art cannot provide various visual effects, thereby lowering the sense of reality and thus lowering the interest.

DISCLOSURE

Technical Problem

Accordingly, the present invention has been made in view of the above-mentioned problems occurring in the related art, and it is an object of the present invention to provide a stereoscopic imaging device capable of providing two-dimensional image and three-dimensional image of good image quality having a sharp three-dimensional effect, thereby enhancing three-dimensional vividness and reality and thus increasing interest.

Technical Solution

To accomplish the above-mentioned object, according to a first aspect of the present invention, there is provided a stereoscopic imaging device including: a body having a stereoscopic image display window for providing a stereoscopic image; an image combining panel which divides an inner space of the body into a first space for providing a virtual image, and a second space for providing a real image, on the stereoscopic image display window, transparency of the image combining panel being changed by input of a power; a first display which is positioned in the first space to provide the virtual image on the stereoscopic image display window through the image combining panel; a target mechanism which is positioned in the second space to provide the real image on the stereoscopic image display window through the image combining panel; an illumination mechanism which is positioned in the second space to illuminate a beam of light onto the target mechanism; and a control unit for controlling the respective units.

The stereoscopic imaging device may further include a translucent panel which is overlapped with the image combining panel.

The image combining panel may have a pair of transparent electrode plates which are disposed away to be opposite to each other and are electrically connected to each other, and a polymer liquid crystal layer containing liquid crystal molecules which are regularly or irregularly between the pair of transparent electrode plates according to selective supply of a power.

The image combining panel may further have a transparent protective layer which is attached to an outer surface of the transparent electrode plate in order to protect the transparent electrode plate.

The image combining panel may be rotatably connected to the body.

The image combining panel may have a drive mechanism for rotating the image combining panel in the body.

The stereoscopic imaging device may further include a second display which is positioned in the second space to provide the real image through the image combining panel.

The target mechanism or the second display may be meshed with a motor so as to be moved in the second space.

The target mechanism may have a reel which is formed in a cylindrical shape, a reel support for rotatably supporting the reel in the body, and a reel rotating motor for rotating the reel.

The target mechanism may have an operation detecting unit for determining an operation state or a position of the target mechanism, and the control unit can control any event if information detected by the operation detecting unit is consistent with information previously set in the control unit.

The control unit can control the image combining panel and the illumination mechanism so that there is a difference between a point of time when the image combining panel is switched between a transparent state and an opaque state, and a point of time when the illumination mechanism illuminating the reel is turned on.

According to a second aspect of the present invention, there is provided a stereoscopic imaging device including: a body having a stereoscopic image display window for providing a stereoscopic image; an image combining panel which divides an inner space of the body into a first space for providing a virtual image, and a second space for providing a real image, on the stereoscopic image display window, and is made of a transparent material; a first display which is positioned in the first space to provide the virtual image on the stereoscopic image display window through the image combining panel; a target mechanism which is positioned in the second space to provide the real image on the stereoscopic image display window through the image combining panel; an illumination mechanism which is positioned in the second space to illuminate a beam of light onto the target mechanism; and a control unit for controlling the respective units.

Advantageous Effects

According to the present invention, since the stereoscopic imaging device includes the image combining panel of which transparency is changed by the supply of the power. Therefore, the real image of the target mechanism through the image combining panel becomes sharp, thereby improving the three-dimensional effect of the stereoscopic image formed by combining the real image with the virtual image reflected by the image combining panel. It is possible to enhance the vividness and reality of the stereoscopic image.

Also, since the transparency of the image combining panel is changed by the supply of the power, the two-dimensional image of the high quality can be provided, without the unnecessary image.

Since the translucent panel is overlapped with the image combining panel, the reflection rate of the image formed by the first display which is reflected by the image combining panel is improved, thereby improving the three-dimensional effect of the stereoscopic image provided on the stereoscopic image display window.

In addition, the target mechanism is configured to be able to rotate, thereby improving the visual display effect and thus enhancing the vividness and reality of the stereoscopic image.

The operation detecting unit detects the operation state or the position of the target mechanism, and the control unit executes any event if the information detected by the operation detecting unit is consistent with the information previously set in the control unit. Therefore, when the event is executed, various visual or auditory effects are provided by the stereoscopic image display window, thereby enhancing the vividness and reality of the stereoscopic image.

Also, the image combining panel is made of the inexpensive transparent glass or synthetic resin, thereby lowering its manufacturing cost.

DESCRIPTION OF DRAWINGS

FIG. 1 is a cross-sectional view illustrating a stereoscopic imaging device according to one embodiment of the present invention.

FIG. 2 is a cross-sectional view illustrating an image combining panel of the stereoscopic imaging device according to one embodiment of the present invention, in which an array of liquid crystal molecules is regular to allow a beam of light to penetrate.

FIG. 3 is a cross-sectional view illustrating an image combining panel of the stereoscopic imaging device according to one embodiment of the present invention, in which an array of liquid crystal molecules is irregular to scatter a beam of light.

FIG. 4 is a side view schematically illustrating one example of a drive mechanism for the stereoscopic imaging device according to one embodiment of the present invention.

FIG. 5 is a cross-sectional view illustrating a stereoscopic imaging device including a second display according to one embodiment of the present invention.

FIG. 6 is a block diagram illustrating the stereoscopic imaging device according to one embodiment of the present invention.

FIG. 7 is a cross-sectional view illustrating a stereoscopic imaging device according to other embodiment of the present invention.

DESCRIPTION OF REFERENCE NUMERALS

100: Body
110: Stereoscopic image display window
120: Second space
130: First space
200: Image combining panel
210: Transparent protective layer
220: Transparent electrode plate
230: Polymer liquid crystal layer
240: Drive mechanism
241: Gear
242: Motor
243: Hinge shaft
300: Translucent panel
400: First display
500: Target mechanism
510: Illumination mechanism
520: Reel support
540: Reel rotating motor
550: Operation detecting unit
600: Control unit
700: Second display
800: Audio Mechanism

MODE FOR INVENTION

Hereinafter, one embodiment of the present invention will be described in detail with reference to the accompanying drawings.

Herein, a virtual image means an image reflected on an image combining panel 200 which will be described later, and a real image means an image which is directly seen through a stereoscopic image display window 110 or goes through the image combining panel 200.

As illustrating in FIG. 1, a stereoscopic imaging device according to the embodiment of the present invention may include a body 100.

The body 100 is formed in the shape of a box, of which one side is opened to provide the stereoscopic image, and the opened side may be provided with the stereoscopic image display window 110 for providing the stereoscopic image.

The inside of the body 100 may be divided by a first space 130 for providing the virtual image by the image combining panel 200 which will be described later, and a second space 120 for providing the real image.

Although inside of the body 100 is divided by the first space 130 for providing the virtual image and the second space 120 for providing the real image, it is obvious that the inside of the body 100 can be divided by the first space 130 for providing the real image and the second space 120 for providing the virtual image.

In this instance, the inside of the body 100 is painted by a black color to provide the sharp stereoscopic image, so that the inner space is dark, like a darkroom.

Since the inner space of the body 100 is dark, like a darkroom, the virtual image provided by the first space 130 and the real image provided by the second space 120 are more clearly seen, thereby providing the sharper stereoscopic image.

The stereoscopic imaging device according to the embodiment of the present invention may include the image combining panel 200.

The image combining panel 200 can divide the inner space of the body 100 in a diagonal direction when seen from the side of the first space 130 providing the virtual image and the second space 120 providing the real image.

As illustrated in FIGS. 2 and 3, the image combining panel 200 may have a pair of transparent electrode plates 220 which are disposed away to be opposite to each other and are electrically connected to each other, and a polymer liquid crystal layer 230 containing liquid crystal molecules 231 which are regularly or irregularly between the pair of transparent electrode plates 220 according to selective supply of a power.

In addition, the image combining panel 200 may have a transparent protective layer 210 which is attached to an outer surface of the transparent electrode plate 220 in order to protect the transparent electrode plate 220.

With the configuration of the image combining panel 200, if the power is supplied, the liquid crystal molecules 231 of the polymer liquid crystal layer 230 are regularly arranged to be in a transparent state through which a beam of light penetrates. If the power is not supplied, the liquid crystal molecules 231 are irregularly arranged to be in an opaque state which scatters the light.

When the image combining panel 200 is in the opaque state, it serves as a mirror to reflect the light, so that it reflects the image provided from the first space 130, and then provides the virtual image to the stereoscopic image display window 110.

Also, when the image combining panel 200 is in the opaque state, the image combining panel 200 interrupts the real image provided from the second space 120, and provides only the virtual image provided from the first space 130, thereby creating a two-dimensional image of high quality which does not have an unnecessary image.

When the image combining panel 200 is in the transparent state, the image combining panel 200 reflects the image provided from the first space 130, and provides the virtual image to the stereoscopic image displaying window 110, and the image or the shape of an object provided from the second space 120 goes through the image combining panel 200, so that the real image is provided to the stereoscopic image display window 110.

Since the image combining panel 200 is in the transparent state, the image or the shape of the object goes through the image combining panel 200 to more clearly the real image, thereby providing the sharp stereoscopic image.

As described above, when the image combining panel 200 is in the transparent state, the image combining panel provides the rear image and the virtual image to the stereoscopic image display window 110 in a state in which the virtual image is spaced apart from the real image, thereby enhancing the illusion of depth in the stereoscopic image.

A hinge shaft 243 is engaged to both sides of an upper end or lower end of the image combining panel 200, and the image combining panel 200 can be rotated around the hinge shaft 243 in the body 100 to adjust an installation angle of the image combining panel 200.

The depth of the virtual image seen from the stereoscopic display window 110 can be varied by adjusting the installation angle of the image combining panel 200, thereby further improving a three-dimensional effect.

As illustrated in FIG. 4, the image combining panel 200 may include a drive mechanism 240.

The drive mechanism 240 gives a driving force to rotate the image combining panel 200 which is rotatably connected to the body 100.

The drive mechanism 240 may employ a motor 242, and the drive mechanism 240 may be directly connected to the hinge shaft 243 of the image combining panel 200, or may control power and speed of the motor 242 by a plurality of gears 241 meshing with each other, so as to drive the image combining panel 200.

The stereoscopic imaging device according to the embodiment of the present invention may further include a translucent panel 300.

The translucent panel 300 may be overlapped with the surface of the image combining panel 200 facing the first space 130, so as to provide the virtual image to the stereoscopic image display window 110 by reflecting the image provided from the first space 130.

The translucent panel 300 means a panel having the same reflection rate and permeation rate due to molecular structure of the material, for example, a half mirror.

The stereoscopic imaging device according to the embodiment of the present invention may further include a first display 400.

The first display 400 is positioned in the first space 130 to provide the virtual image to the stereoscopic image display window 110 through the image combining panel 200.

That is, the image reproduced by the first display 400 is reflected by the image combining panel 200, and then is shown through the stereoscopic image display window 110 as the virtual image.

The first display 400 is located in the first space 130 to face the image combining panel 200 in such a way that one end faces the image combining panel 200, and the other end faces the stereoscopic image display window 110.

The first display 400 receives an image signal and to provide an image, and, for example, the first display 400 may be realized by a liquid crystal display.

The stereoscopic imaging device according to the embodiment of the present invention may further include a target mechanism 500.

The target mechanism 500 may be positioned in the second space 120 so as to provide the real image to the stereoscopic image display window 110 through the image combining panel 200.

That is, the target mechanism 500 can provide the real image which goes through the image combining panel 200 and is seen through the stereoscopic display window 110.

In this instance, the real image provided to the stereoscopic image display window 110 through the image combining panel 200 is combined with the virtual image having the illusion of depth which is provided to the stereoscopic image display window 110 through the image combining panel 200, allowing the viewer to perceive the three-dimensional depth in the image.

The target mechanism 500 may be provided in various shapes to create the real image on the stereoscopic image display window 110.

The target mechanism 500 is meshed with the motor, so that the target mechanism can be freely rotated in the second space 120.

Herein, it is explained a case in that the stereoscopic imaging device is a game console, and the target mechanism 500 is applied to a game reel 520.

The target mechanism 500 may have a reel, a reel support 530, and a reel rotating motor 540.

The reel 520 is formed in a cylindrical shape, and a plurality of designs may be applied on the outer surface of the reel 520.

The reel rotating motor 540 transfers a rotating force to the reel 520, and the reel 520 is rotated to provide the plurality of designs to the stereoscopic image display window 110.

With the above configuration, the reel 520 is rotated by the reel rotating motor 540 to create or enhance the three-dimensional reality, thereby further increasing the interest of the viewer who watches the stereoscopic image through the stereoscopic image display window 110 and thus increasing a game participation rate.

The reel support 530 is formed in the shape of rod so that the reel 520 is rotated about a rotation shaft 521. One end of the reel support 530 is connected to the rotation shaft 521 of the reel 520, and the other end is connected to the body 100, thereby supporting the reel 520.

The target mechanism 500 has an operation detecting unit 550 for determining operation and position of the reel 520 which is rotated by the reel rotating motor 540. When the rotation of the reel 520 is stopped, the operation detecting unit 550 detects the design of the reel 520 which is provided on the stereoscopic display window 110, and sends the detected information to a control unit 600.

For example, the operation detecting unit 550 has a sensor for detecting the position of the reel 520. The sensor detects the position of the reel 520 when the rotation of the reel 520 is stopped, thereby detecting the design provided on the stereoscopic image display window 110.

Alternatively, the reel rotating motor 540 may be rotated at a given angle for every drive pulse supplied from the control unit 600 which will be described later, so as to rotate the reel 520, and the operation detecting unit 550 may count the drive pulse to detect the design of the reel 520 provided on the stereoscopic image display window 110.

The stereoscopic imaging device according to the embodiment of the present invention may include an illumination mechanism 510.

The illumination mechanism 510 is positioned in the second space 120 to illuminate the beam of light onto the target mechanism 500 so that the target mechanism 500 provides the sharp real image to the stereoscopic image display window 110 through the image combining panel 200.

That is, since the inside of the second space 120 is dark, like a darkroom, if the illumination mechanism 510 illuminates the beam of light onto the target mechanism 500, the target mechanism 500 is shown to relatively go through the image combining panel 200, and thus the real image is more sharply provided on the stereoscopic image display window 110, thereby enhancing the three-dimensional effect of the stereoscopic image. Therefore, it is possible to give the stereoscopic image of high vividness and reality to the viewer.

The illumination mechanism 510 may be realized by a light emitting diode or a fluorescent light, for example. It is preferable that the illumination mechanism 510 is provided in the target mechanism 500, or intensively illuminates the beam of light onto the target mechanism 500.

As illustrated in FIG. 5, the stereoscopic imaging device according to the embodiment of the present invention may include a second display 700.

The second display 700 is positioned in the second space 120 to provide the real image on the stereoscopic image display window 110 through the image combining panel 200.

That is, the image formed by the second display 700 goes through the image combining panel 200, and then is provided as the real image to be shown through the stereoscopic image display window 110.

In this instance, the real image provided on the stereoscopic image display window 110 through the image combining panel 200 is combined with the virtual image having the illusion of depth provided on the stereoscopic image display window 110 through the image combining panel 200, thereby giving the stereoscopic image having the illusion of depth to the viewer.

Herein, the second display 700 is configured to receive the image signal and provide an image. For example, the second display 700 may be realized by a liquid crystal display.

Also, the second display 700 is meshed with the motor, so that the second display can be freely rotated in the second space 120.

The stereoscopic imaging device according to the embodiment of the present invention may further include the control unit 600.

The control unit 600 can control the operation of the image combining panel 200, the first display 400, the target mechanism 500, the illumination mechanism 510, and the second display 700.

The control unit 600 compares the information detected by the operation detecting unit 550 with information previously set in the control unit 600, and can execute any event if the information of the operation detecting unit 550 is consistent with the information previously set in the control unit 600 or not.

Also, the control unit 600 can control the image combining panel 200 and the illumination mechanism 510 so that there is a difference between the point of time when the image combining panel 200 is switched between the transparent state and the opaque state, and the point of time when the illumination mechanism 510 illuminating the reel 520 is turned on.

For example, the image combining panel 200 is switched from the transparent state to the opaque state to give the image, which is related to the event provided by the first display 400, to the viewer.

When the image combining panel 200 is switched from the opaque state to the transparent state, the control unit 600 delays the point of time when the illumination mechanism 510 is turned on, rather than the point of time when the image combining panel 200 is switched from the opaque state to the transparent state.

By use of the difference between the times when the real image and the virtual image are respectively formed on the stereoscopic image display window 110, the visual effect is provided to enhance the reality of the game and thus increase the interest of the game.

Meanwhile, the control unit 600 generates information on the event in the second display 700, when the event is executed, thereby increasing the interest in the game and the game participation rate.

When the event is executed, the control unit 600 controls the target mechanism 500 and the second display 700 so as to allow the target mechanism 500 and the second display 700 to freely move in the second space 120, thereby improving the visual effect and thus increasing the interest in the game.

Also, when the event is executed, the control unit 600 controls an audio mechanism 800 to produce a sound effect related to the event, thereby increasing the interest in the game and the game participation rate.

The operation and the effect of each components described above will now be explained.

With the stereoscopic imaging device according to the embodiment of the present invention, the power is supplied to the image combining panel 200 by the control unit 600, and the liquid crystal molecules 231 are regularly arranged, so that the image combining panel 200 becomes the transparent state in which the beam of light goes through.

The control unit 600 gives the necessary video information to the first display 400, and the image formed by the first display 400 is reflected by the image combining panel 200, thereby providing the virtual image having the illusion of depth which is shown through the stereoscopic image display window 110.

Since the inner space of the body 100 is dark, like a darkroom, the virtual image reflected by the image combining panel 200 and provided on the stereoscopic image display window 110 can be more clearly seen. Therefore, it can give the sharper stereoscopic image to the viewer who watches the stereoscopic image through the stereoscopic image display window 110.

Meanwhile, the target mechanism 500 is irradiated by the beam of light from the illumination mechanism 510, and thus the sharp real image is formed on the stereoscopic image display window 110 through the image combining panel 200 which becomes the transparent state.

In this instance, since the image combining panel 200 is the transparent state, the transmissivity of the target mechanism 500 through the image combining panel 200 is improved, thereby forming the sharp real image on the stereoscopic image display window 110.

In addition, since the illumination mechanism 510 illuminates the beam of light onto the target mechanism 500, the target mechanism 500 is shown to relatively go through the image combining panel 200, and thus the real image is more sharply provided on the stereoscopic image display window 110.

Since the inner space of the body 100 is dark, like a darkroom, the real image provided by the second space 120 is sharp, thereby enhancing the vividness and reality of the stereoscopic image.

As described above, when the image combining panel 200 is the transparent state, the sharp real and virtual images are provided on the stereoscopic image display window 110. Since the virtual image is provided at a position apart from the real image, it is possible to give the stereoscopic image of the enhanced vividness and reality.

Meanwhile, since the target mechanism 500 is rotated by the reel rotating motor 540, it is possible to increase the interest of the viewer who watches the stereoscopic image through the stereoscopic image display window 110.

That is, the stereoscopic image display window 110 provides the plurality of design formed on the outer surface of the reel 520 as moving stereoscopic images, thereby improving the visual display effect and thus increasing the interest of the game and the game participation rate.

The operation detecting unit 550 detects the operation state or the position of the target mechanism 500, and the control unit 600 compares the information detected by the operation detecting unit 550 with the information previously set in the control unit 600, and executes any event if the information of the operation detecting unit 550 is consistent with the information previously set in the control unit 600 or not.

Also, the control unit 600 makes the difference between the point of time when the image combining panel 200 is switched between the transparent state and the opaque state, and the point of time when the illumination mechanism 510 illuminating the reel 520 is turned on, in order to increase the vividness and reality of the game when the event is executed.

For example, when the event is executed, the control unit 600 switches the image combining panel 200 from the transparent state to the opaque state, giving the image, which is related to the event provided by the first display 400, to the viewer.

When the image combining panel 200 is switched from the opaque state to the transparent state, the control unit 600 delays the point of time when the illumination mechanism 510 is turned on, rather than the point of time when the image combining panel 200 is switched from the opaque state to the transparent state.

The difference between the times when the real image and the virtual image are respectively formed on the stereoscopic image display window 110 arouses the interest of the viewer who watches the stereoscopic image, thereby increasing the interest of the game.

The first display 400 or the second display 700 provides the viewer the information on the game and the information related to the event when the event is executed, thereby increasing a degree of understanding and thus increasing the interest in the game and the game participation rate.

Also, when the event is executed, the control unit 600 produces the sound effect related to the event, thereby increasing the vividness and reality of the game.

The control unit 600 controls the target mechanism 500 and the second display 700 so that the target mechanism 500 and the second display 700 can be freely moved in the second space 120, thereby improving the visual effect and increasing the interest in the game.

Meanwhile, the control unit 600 interrupts the supply of the power to the image combining panel 200, so that the array of the liquid crystal molecules 231 becomes irregular. Therefore, the beam of light is scattered by the image combining panel 200, and thus the image combining panel 200 becomes the opaque state.

The control unit 600 provides the necessary image information to the first display 400, and thus the image combining panel 200 of the opaque state serves as a mirror for reflecting the beam of light to reflect the image formed by the first display 400, thereby providing the virtual image on the stereoscopic image display window 110.

In this instance, the translucent panel 300 is overlapped with the surface of the image combining panel 200 which faces the first space 130, thereby further improving the reflection rate of the image formed by the first display 400 which is reflected by the image combining panel 200, and thus further improving the quality of the stereoscopic image.

If the image combining panel 200 is the opaque state, the image combining panel 200 interrupts the real image provided from the second space 120, so that only the image provided from the first space 130 is provided, thereby giving the two-dimensional image of the high quality, without unnecessary image.

Therefore, the stereoscopic imaging device according to the embodiment of the present invention includes the image combining panel 200 of which transparency is changed by the supply of the power. Therefore, the real image of the target mechanism 500 through the image combining panel 200 becomes sharp, thereby improving the three-dimensional effect of the stereoscopic image formed by combining the real image with the virtual image reflected by the image combining panel 200. It is possible to enhance the vividness and reality of the stereoscopic image.

Also, since the transparency of the image combining panel 200 is changed by the supply of the power, the two-dimensional image of the high quality can be provided, without the unnecessary image.

Since the translucent panel 300 is overlapped with the image combining panel 200, the reflection rate of the image formed by the first display 400 which is reflected by the image combining panel 200 is improved, thereby improving the three-dimensional effect of the stereoscopic image provided on the stereoscopic image display window.

In addition, the target mechanism 500 is configured to be able to rotate, thereby improving the visual display effect and thus enhancing the vividness and reality of the stereoscopic image.

The operation detecting unit 550 detects the operation state or the position of the target mechanism 500, and the control unit 600 executes any event if the information detected by the operation detecting unit 550 is consistent with the information previously set in the control unit 600 or not. Therefore, when the event is executed, various visual or auditory effects are provided by the stereoscopic image display window 110, thereby enhancing the vividness and reality of the stereoscopic image.

A stereoscopic imaging device according to another embodiment of the present invention is substantially identical to the stereoscopic imaging device according to the embodiment of the present invention, except for the image combining panel 200. Therefore, the same components are designated by the same reference numerals, and the detailed description thereof will be omitted herein.

An image combining panel 200' according to another embodiment of the present invention can be made of a panel of a transparent material.

The image combining panel 200' can be made of a transparent panel, for example, a transparent glass or a transparent synthetic resin.

The image combining panel 200' can divide the inner space of the body 100 in a diagonal direction when seen from the side of the first space 130 providing the virtual image and the second space 120 providing the real image, similar to the image combining panel 200.

That is, the image combining panel 200' reflects the image provided from the first space 130 to provide the virtual image on the stereoscopic image display window 110, and the image provided from the second space 120 or the shape of the object goes through the image combining panel 200' to provide the real image on the stereoscopic image display window 110.

Accordingly, since the image combining panel 200' of the stereoscopic imaging device according to another embodiment of the present invention is positioned in the dark space of the body 100, the reflection rate of the image provided from the first space 130 is high, and the shape of the target mechanism 500 positioned in the second space 120 is further clearly seen, thereby providing the sharper stereoscopic image.

Also, the image combining panel 200' is made of the inexpensive transparent glass or synthetic resin, thereby lowering its manufacturing cost.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention can be applied to an industrial field related to entertainment stereoscopic image display, such as a field of a game console, a film field, or a field of advertising.

The invention claimed is:

1. A stereoscopic imaging device comprising:
a body having a stereoscopic image display window for providing a stereoscopic image, a first space for providing a virtual image, and a second space for providing a real image, wherein the stereoscopic image display window defines a length of the first and the second spaces;
an image combining panel, which divides an inner space of the body so as to define the first space and the second space, having a drive mechanism at one end of the image combining panel being configured to rotate the image combining panel in the body, wherein transparency of the image combining panel is changed by input of a power;
one surface of a translucent panel being overlapped with one surface of the image combining panel, the other surface of the translucent panel being facing the first space and the other surface of the image combining panel facing the second space;
a first display which is positioned in the first space to provide the virtual image on the stereoscopic image display window through the image combining panel;
a second display which is positioned within the second space and the stereoscopic display window to provide the real image through the image combining panel;
a target mechanism which is positioned in the second space to provide the real image on the stereoscopic image display window through the image combining panel,
wherein the target mechanism or the second display is meshed with a motor so as to be moved in the second space;
an illumination mechanism which is positioned in the second space to illuminate a beam of light onto the target mechanism; and
a control unit for controlling the image combining panel, the first display, the second display, the target mechanism, and the illumination mechanism.

2. The stereoscopic imaging device according to claim 1, wherein the image combining panel has a pair of transparent electrode plates which are disposed away to be opposite to each other and are electrically connected to each other, and a polymer liquid crystal layer containing liquid crystal molecules which are regularly or irregularly between the pair of transparent electrode plates according to selective supply of a power.

3. The stereoscopic imaging device according to claim 2, wherein the image combining panel further has a transparent protective layer which is attached to an outer surface of the transparent electrode plate in order to protect the transparent electrode plate.

4. The stereoscopic imaging device according to claim 1, wherein the image combining panel is rotatably connected to the body.

5. The stereoscopic imaging device according to claim 1, wherein the target mechanism has a reel which is formed in a cylindrical shape, a reel support for rotatably supporting the reel in the body, and a reel rotating motor for rotating the reel.

6. The stereoscopic imaging device according to claim 1, wherein the target mechanism has an operation detecting unit for determining an operation state or a position of the target mechanism, and the control unit controls any event if information detected by the operation detecting unit is consistent with information previously set in the control unit.

7. The stereoscopic imaging device according to claim 6, wherein the control unit controls the image combining panel and the illumination mechanism so that there is a difference between a point of time when the image combining panel is switched between a transparent state and an opaque state, and a point of time when the illumination mechanism illuminating the reel is turned on.

8. A stereoscopic imaging device comprising:
- a body having a stereoscopic image display window for providing a stereoscopic image, a first space for providing a virtual image, and a second space for providing a real image, wherein the stereoscopic image display window defines a length of the first and the second spaces;
- an image combining panel which divides an inner space of the body so as to define the first space and the second space, having a drive mechanism at one end of the image combining panel being configured to rotate the image combining panel in the body, wherein the image combining panel is made of a transparent material;
- one surface of a translucent panel being overlapped with one surface of the image combining panel, the other surface of the translucent panel being facing the first space and the other surface of the image combining panel facing the second space;
- a first display which is positioned in the first space to provide the virtual image on the stereoscopic image display window through the image combining panel;
- a second display which is positioned within the second space and the stereoscopic display window to provide the real image through the image combining panel;
- a target mechanism which is positioned in the second space to provide the real image on the stereoscopic image display window through the image combining panel;
- an illumination mechanism which is positioned in the second space to illuminate a beam of light onto the target mechanism; and
- a control unit for controlling the image combining panel, the first display, the second display, the target mechanism, and the illumination mechanism.

* * * * *